Sept. 17, 1935.   H. L. MURRAY   2,014,580
METHOD OF AND APPARATUS FOR DEODORIZING CREAM, MILK AND OTHER FLUIDS
Filed Aug. 18, 1931
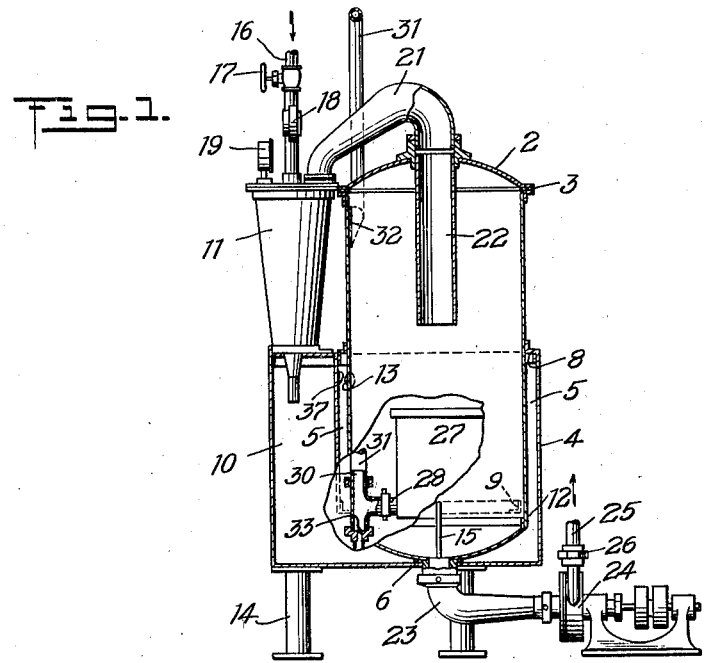
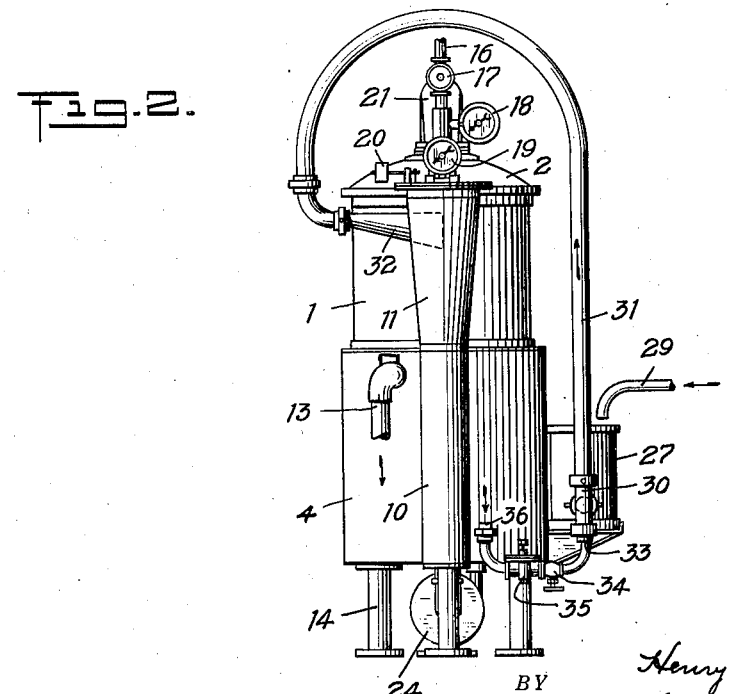
INVENTOR
Henry Lamont Murray
BY Kenyon & Kenyon
ATTORNEYS Patented Sept. 17, 1935

2,014,580

UNITED STATES PATENT OFFICE 2,014,580

METHOD OF AND APPARATUS FOR DEODORIZING CREAM, MILK, AND OTHER FLUIDS

Henry Lamont Murray, Auckland, New Zealand, assignor to Te Aroha Dairy Company Limited, Te Aroha, New Zealand Application August 18, 1931, Serial No. 557,858
In New Zealand September 12, 1930

11 Claims. (Cl. 99—11)

While this invention is obviously applicable to the deodorization of other fluids, it has been primarily devised with the object of providing an improved method of and apparatus for the treatment of cream whereby such a fluid may be wholly or substantially freed from the usual odoriferous taints and vegetable chemical contaminations arising from the cow's fodder.

The satisfactory solution of this problem has admittedly been a very difficult one attracting the attention of experts for many years. This will be readily understood when it is realized that any effective treatment must necessarily be sufficiently active to remove the more refractory taints and yet at the same time not injure the body of the cream or butter. Furthermore, a commercially practical process to be successful must not entail a costly and cumbersome plant.

Before setting forth my improved process and preferred apparatus for carrying same into effect it will be convenient to state what I consider to be the essential difficulties to be overcome and what as a result of extensive investigations I consider to be the theory underlying the successful treatment of the cream.

Every form of vegetation secretes its own peculiar essential oil. This oil consists of a series of fractions, varying in volatility and containing certain complex odorous and flavouring substances or principles, the majority of which are insoluble in water.

If a cow receives a properly balanced fodder ration, her system is able to utilize the various essential oils and chemical compounds contained therein, but if her ration contains any particular oil or oils to excess, then the surplus is rejected by her organism and in large part finds its way into the milk stream. Being oils, these essences show a natural affinity for the butterfat globules which become coated therewith in what is practically a state of surface fusion owing to the solvent power of the essences.

In deodorization of cream the problem therefore is to eliminate the foreign flavouring oils without extraction of or physical harm to the butterfat.

This means that the volatile fractions must first be vapourized and the insoluble principles removed by physical washing and entrainment in the washing agent.

As it is impracticable to employ temperatures sufficient to actually boil the essential oils (which temperatures may be as high as 600° F.) and thus evaporate them, I have in practice to be content with volatilization at lower temperatures. This is best attained by boiling under reduced air pressure, when the vapour tension is much increased. Hence the necessity for vacuum processing.

By entirely vapourizing the volatile fractions in this way, it would seem the dissolved surfaces of the butterfat globules revert to their original state and the odorous principles become deposited upon the surfaces of the fat globules from whence they must be removed by physical contact with, preferably, wet steam.

I contend that all creams contain a degree of vegetable chemical contamination which though often not apparent to the senses of smell and taste, militates against the keeping quality of the butter.

Certain vegetable oils are more tenacious and noticeable in their contamination of cream than are others. These may be typified by the oils of rape, turnip-tops, pennyroyal, ground cress, mustard weed and wild onion.

To effectively remove such taints the following process steps are necessary:—

1. Preheating the liquid to be deodorized to between 145° F. and 210° F. according to the nature of the fluid and the oils to be removed.
2. Exposure so far as is possible of each particle to treatment.
3. Vapourization of volatile fractions.
4. Solution of water soluble principles by wet steam.
5. Removal and entrainment of insoluble principles by, preferably, wet steam.

To be ideal any unit of plant employed for carrying out such a process must be capable of conforming to such practical limitations as—low capital cost, low operating cost, continuity of operation, automaticity, high capacity, small floor space, low power consumption, suitability of metals used in construction, ease of cleaning, and longevity.

A degree of cooling is also advantageous.

My new improved apparatus while admirably suited to carry out my improved process is designed to meet the requirements and limitations aforementioned. In essence it provides means for the boiling, disjunction, and cleansing of the cream by wet steam under vacuum and the separation of the vapours by centrifugal force, but in a manner more intense and more simply performed than in the apparatus as previously disclosed by my previous Letters Patent 1,641,349 and 1,864,849.

These reveal methods wherein preheated cream is introduced into vacuum chambers both heated and unheated and the vapours expelled by centrifugal force mechanically applied. These methods while proving quite practicable for ordinary contaminations as proven by their adoption in various countries, yet have two important disabilities in that the cost of apparatus is high and the capacity when dealing with strong taints is too low.

By reason of my prior United States Letters Patent it may be said that in the art of deodorizing fluids of objectionable odoriferous flavours it is known to introduce the hot fluid to be deodorized into a vertically or horizontally disposed container (which may be steam jacketed) under a degree of vacuum wherein it is treated to the action of revolving sweeps the while intense ebullition is caused, the vapours and gases being carried off under vacuum and the liquid continuously discharged from the container substantially free from such objectionable odours.

In addition to this I have already proposed in a prior United States specification Serial No. 370,980 to introduce steam along with the fluid as it is being introduced to a steam jacketed vacuum container so that said steam will cause splitting up or partial atomization of the fluid on entry to the container and give a washing effect to cleanse the particles from the odoriferous oils and dissolve the odorous substances within the oils.

Now according to the present invention, a method of and apparatus for deodorizing and cooling fluids has been devised which eliminates or minimizes the defects hereinbefore mentioned, which completely eliminates the use of sweeps with incidental driving means, ensures each particle of fluid receiving the requisite treatment, increases the speed of treatment and results in a considerable reduction of cost.

Now, according to the present process the cream is first of all preheated to the desired temperature, say about 200° F. by flash pasteurization, and is then drawn on its way to a vacuum container, subjected to the influence of a jet of saturated steam so arranged and disposed that the cream and steam enter the container tangentially at a very high velocity thereby causing a swirling or centrifugal action to be set up within the container.

Now before dealing with the next step in the process it will be observed that, immediately the cream enters the intake pipe to the vacuum container and even before it is subjected to the influence of the steam jet, owing to the existence of the vacuum which may range from 10 inches to as high as possible but preferably will be under usual conditions about 25 inches, the super-heat in the cream is almost instantaneously given up by being utilized to overcome the latent heat of the water content and the production of vapour sufficient to reduce the temperature to approximately 134° F. being the boiling point under 25 inches of vacuum.

This instant and intense boiling greatly lowers the density of the cream and at the same time promotes an increased velocity thereof through the intake pipe.

Now, as has been stated above, shortly before reaching the vacuum chamber proper, this frothy mixture is subjected to a jet of saturated steam at a desired pressure for example, of 5 lbs. to 20 lbs. per sqare inch which enters through a nozzle of preferably ⅝ inch diameter and mixes with the boiling cream. Owing to the vacuum, this entering steam expands so tremendously and suddenly (without, however, raising the visible temperature of the mixture) that it virtually explodes the passing cream into minute particles, thus exposing each separate fat globule and particle of colloidal casein to the processing effect of the steam.

Thus exposed, the vegetable oils clinging to the fat globules are rapidly vapourized and the deposited odorous substances removed by the cleansing or scrubbing action of the steam which also serves as the medium for entrainment and transfer to the condenser.

It is to be observed that the introduced steam in no wise condenses during its rapid passage with the cream. In fact, in spite of the admixture of steam, the cream will probably undergo a definite degree of concentration because of the evaporation occasioned by its original superheat.

For the purposes of illustration, taking the preheated cream flow at say 8000 lbs. an hour under a vacuum of say 25 inches, the introduction of saturated steam say 300 lbs. an hour thereinto so tremendously increases the velocity of the vapourous mixture as it issues from the intake pipe (say 2 inches in diameter) that on entry to the vacuum chamber the velocity would approximate 950 miles per hour.

The next step in the process is to separate the vapours with their oil content from the heavier cream content mixed therewith and to this end the centrifugal action already imparted to the fluid, coupled with the vacuum, is made to assist somewhat on the principle for example, of a cyclone separator. The liquid portions of the atomized vapourous mixture are thrown to the periphery to collect as a spirally descending stream while the true vapours flow centripetally towards the vacuum centre to be upwardly removed and condensed, the descending cream being preferably further cooled as by water jacketing the lower portion of the vacuum container.

The cream is then drawn in a deodorized condition from the bottom of the container.

The above description has been made with special reference to the treatment of cream. The process for milk and other fluids will be substantially the same, the pasteurizing temperature of the milk being naturally lower, say 145° when batch, and 165° when flash pasteurized.

Saturated steam is desirable in the case of cream and milk but superheated steam may be effectively used in the treatment of margarine and other vegetable oils.

I shall now describe a constructional form of apparatus which has been found in practice very suitable, reference being made to the accompanying drawings in which Figure 1 shows a partially sectioned elevation of the apparatus and Figure 2 a side elevation thereof.

There is provided a vertical cylindrical separator chamber 1 made preferably of stainless steel having at its top a removable cover 2 with a suitable rubber or like joint 3, said chamber 1 being mounted on a base 4 which is cylindrical in shape and which forms a jacket 5 for the lower portion of the chamber 1, the latter resting by its outlet fitting 6 on the bottom of the base 4 and receiving support by angle rings 8 and 9.

An extension 10 is provided to the side of base 4 for the purpose of carrying the vacuum providing means 11 (which may be an ejector condenser 11 of the type described in the specifications relating to my previous United States Letters Patent No. 1,641,349 and No. 1,864,849) the discharged water from said condenser 11 being adapted to fill the base 4 and circulate up into the jacket 5 by way of a gap 12 in the lower angle ring 9, a jacket outlet 13 being connected to near the top of jacket 5 for discharge of water therefrom.

The base 4 is mounted on suitable legs 14 and a vertical anti-swirl baffle 15 is placed across the bottom of the chamber 1 above the outlet fitting 6.

The ejector condenser 11 is provided with water supply pipe 16, a water control valve 17, a water pressure gauge 18, a vacuum gauge 19 and a vacuum relief or snifter valve 20, a vapour pipe 21 connecting the condenser 11 to the cover 2 of the separator chamber 1, a down pipe 22 secured to the cover 2 forming an extension of the vapour pipe down into the chamber 1.

To the outlet fitting 6 a suction pipe 23 passes to a centrifugal pump 24 which has the usual delivery pipe 25 this latter being provided with a check valve 26.

To the side of the base 4 is mounted the liquid inlet mechanism (which may be of the type described in the specifications relating to my previous United States Letters Patent No. 1,641,349 and No. 1,864,849) which comprises a float valve tank 27 wherein a float operates a valve to permit liquid only to pass to the inlet pipe 28, the tank 27 itself receiving its supply of fluid by way of pipe 29 from the pasteurizer.

The inlet pipe 28 passes to a T fitting 30 from the upper branch of which a steam scrubber pipe 31 passes upwardly across the apparatus in a semi-circular bend and then horizontally and tangentially in fish tail form 32 into the side and near the top of the separator chamber 1.

The lower branch of the T fitting 30 has a jet or nozzle 33 projecting vertically thereinto which is connected through stop valve 34 and reducing valve 35 to the steam supply pipe 36.

There is a hole 37 in the jacket 5 in the vicinity of the ejector condenser 11 so that the vapours and gases discharged from the latter into the base 4 can pass directly through said hole 37 to the jacket outlet 13.

In operation, the ejector condenser 11 is set in operation by opening the valve 17 on the pressure water supply pipe 16 and this causes a vacuum to be created in the separator chamber 1 and also in the steam scrubber pipe 31.

The centrifugal pump 24 is set in motion, and hot fluid from the pasteurizer or like apparatus permitted to flow into the float tank 27 by way of pipe 29 and the steam valve 34 is also opened, a reducing valve 35 being adjusted so that a constant reduced pressure is obtained at the nozzle or jet 33.

The vacuum of the chamber 1 which is controlled to be constant by means of the snifter valve 20 causes the hot fluid from the tank 27 to be drawn along the inlet pipe 28 to the T fitting 30 where it encounters the jet of saturated steam from nozzle 33 so that the steam and fluid mix and the vapourous mixture passes at high velocity through the scrubber pipe 31, which, having a semi-circular bend at its upper portion, causes said vapourous mixture therein to pass therethrough in a rolling action because of the greater friction along the outer circumference of pipe 31, the vapourous mixture then entering the upper portion of the separator chamber 1 by way of fish tail 32 in a thin strip, the velocity being so great that the atomized cream will accumulate en masse and swirl spirally down towards the bottom of the chamber 1 and liberated vapours and gases will pass off through the pipe 22, vapour pipe 21 and condenser 11.

Now due to the mixing of the saturated steam with the fluid, the latter will be split up into minute particles each of which will be washed with steam, but the frothy mixture this produces will expand so tremendously that on entry to the separator chamber 1 the high velocity at which it enters same and the centrifugal swirling action set up therein will cause the denser matter to flow around the walls of the chamber and the light vapours and odours to be drawn therefrom up the vapour pipe 21 to the ejector condenser 11, wherein said vapours are condensed.

The fluid swirling around the chamber 1 passes down to the bottom thereof being further consolidated by the cooling action of the water jacket 5 within which the water discharged from the ejector condenser 11 flows upwardly to the exhaust 13.

The fluid within the chamber 1 flows spirally downward until it encounters the anti-swirl baffle 15 which stops the swirl and directs the fluid into the suction pipe 23 along which it passes to the centrifugal pump 24 which forces the fluid out of the delivery pipe 25 past the check valve 26 to atmosphere.

I claim:

1. A method of deodorizing cream, milk or other liquids comprising supplying a preheated stream of such liquid at high velocity tangentially into a vacuum chamber having a vertical cylindrical wall, injecting steam into the previously heated liquid stream prior to its introduction into the chamber and utilizing the difference in specific gravity to centrifugally separate the light vapors and gases from the liquid, to cause the liquid to fall to the bottom of the chamber whence it is withdrawn, and to centripetally remove the light vapours and gases from the chamber.

2. A method of deodorizing cream, milk or other liquids comprising supplying a preheated stream of such liquid to an evacuated chamber having a vertical cylindrical wall, injecting steam into the preheated liquid stream and subsequently flowing the mixture of steam and liquid at a high velocity and tangentially into a vacuum chamber thus creating intense centrifugal action causing the liquid to fall to the bottom of the chamber, where it is withdrawn, and utilizing the difference in specific gravities to centripetally remove the light vapours and odours from the chamber.

3. A device of the character described comprising a chamber, means for maintaining uniform sub-atmospheric pressure in said chamber, a pipe through which fluid is drawn into said chamber, said pipe having a curved portion and entering said chamber tangentially thereof, and a jet in communication with said pipe for injecting steam into liquid flowing through the pipe.

4. A device of the character described comprising a chamber, means for maintaining uniform sub-atmospheric pressure in said chamber, means for directing a stream of liquid into said chamber tangentially at high velocity, and means for injecting steam into said liquid stream prior to its introduction into said chamber.

5. A device of the character described comprising a chamber, means for maintaining uniform sub-atmospheric pressure in said chamber, means for directing a stream of liquid into said chamber tangentially at high velocity, means for injecting steam into said liquid stream prior to its introduction into said chamber, and a water jacket enclosing the lower portion of said chamber.

6. A device of the character described comprising a chamber, a pipe for supplying fluid to said chamber, said pipe having a curved portion and entering said chamber tangentially thereof, a steam jet communicating with said pipe exterior of said chamber, an ejector condenser communicating with said chamber, a jacket surrounding the lower portion of said chamber, and connections for conducting the discharge from said condenser into said jacket.

7. A device of the character described comprising a chamber, a pipe for supplying fluid to said chamber, said pipe having a curved portion and entering said chamber tangentially thereof, a steam jet communicating with said pipe, an ejector condenser communicating with said chamber, a jacket surrounding the lower portion of said chamber, connections for conducting the discharge from said condenser into said jacket, and suction means for withdrawing liquid from said chamber.

8. The method of deodorizing liquid by evaporating volatile essences and entraining non-volatile odorous substances, said method consisting in introducing a stream of heated liquid at high velocity into the upper part of a vertical cylindrical container tangentially thereof to produce a revolving wall of liquid, injecting steam into the previously heated liquid stream prior to its introduction into the container, separating vapors and fixed gases from the liquid by centrifugal action, condensing said vapors and exhausting said fixed gases thereby maintaining high vacuum in said container, withdrawing liquid from the bottom of said container and preventing increase in vacuum in said container above a predetermined value.

9. The method of deodorizing liquid containing volatile essences and entrained non-volatile odorous substances, said method consisting in passing a stream of heated liquid at high velocity through a relatively long small-diameter passageway and discharging said stream at high velocity into the upper part of a vertical cylindrical container tangentially thereof to produce a revolving wall of liquid, introducing steam into the previously heated liquid stream adjacent the beginning of said passageway, separating vapors and fixed gases from the liquid by centrifugal action, condensing said vapors and exhausting said fixed gases thereby maintaining high vacuum in said container, withdrawing liquid from the bottom of said container and preventing increase in vacuum in said container above a predetermined value.

10. The method of deodorizing liquid by evaporating volatile essences and entraining non-volatile odorous substances, said method consisting in introducing a stream of heated liquid at high velocity into the upper part of a high vacuum vertical cylindrical container tangentially thereof to produce a revolving wall of liquid, prior to its introduction into the container injecting steam into said stream at a point where sub-atmospheric pressure exists, separating vapors and fixed gases from the liquid by centrifugal action, condensing said vapors and exhausting said fixed gases thereby maintaining high vacuum in said container, withdrawing liquid from the bottom of said container and preventing increase in vacuum in said container above a predetermined value.

11. The method of deodorizing cream, milk or other liquid comprising supplying a preheated stream of such liquid at high velocity tangentially into a high vacuum chamber having a vertical cylindrical wall, prior to its introduction into the container injecting steam into said stream at a point where sub-atmospheric pressure exists, utilizing the difference in specific gravity to centrifugally separate the light vapors and gases from the liquid, continuously draining liquid from the bottom of the chamber, and withdrawing said vapors and fixed gases.

HENRY LAMONT MURRAY.